Patented Apr. 24, 1934

1,956,442

UNITED STATES PATENT OFFICE 1,956,442

COATING COMPOSITIONS

Chester S. Hathaway, Middleboro, Mass., assignor to Lewis F. Harding, Middleboro, Mass.

No Drawing. Application November 5, 1930, Serial No. 493,691

3 Claims. (Cl. 134—39)

This invention relates to coating compositions designed for waterproofing surfaces, protecting them from the weather, and the like.

It is the chief object of the invention to utilize a waste product formed in the manufacture of illuminating gas and commonly known commercially as "drip" or "drip oil". For convenience this product will be hereinafter referred to by the latter name. This drip oil collects or condenses in the mains and gas holders of high pressure gas storing and distributing systems and consists of a clear amber colored oily liquid having a disagreeable smell. It is obtained chiefly from high pressure systems, is a non-drying oil, and, so far as I am aware, has always been regarded heretofore as a waste product. I have found, however, that when this oil is properly combined with other ingredients it has remarkably valuable properties for some purposes, particularly in waterproofing, anti-corrosive and anti-fouling preparations, wood preservatives for either live wood or cut lumber and as a coating to protect iron and steel during shipment.

In making any of the compositions hereinafter mentioned it usually is preferable to make up a base material or composition which later is mixed with other constituents suited to the requirements of individual uses. Such a base material may be made by mixing approximately 55 gallons of drip oil with about 10 pounds of resinate of manganese, or some other good dryer, resinate of manganese being preferred, however, since it dissolves well in the drip oil and makes a good drying compound. Another base material which also satisfies a wide variety of conditions is made by mixing approximately 55 gallons of drip oil with a barrel (376 pounds) of Portland cement, the mixture being thoroughly ground in a mill until quite fine, and 10 pounds, or thereabouts, of resinate of manganese being added to it.

Either of these base materials may themselves be used as coating compounds. It is preferable, however, for most purposes to add other constituents to them to suit them for conditions peculiar to individual uses. For example, a clear varnish-like liquid suitable for waterproofing paper, cloth or wood (the term "waterproofing" being used in its ordinary sense as distinguished from a strict scientific sense) may be made by adding to the first base compound above mentioned 15 gallons of fish oil, 5 gallons of Syps enamel oil, 10 pounds of rosin, 40 pounds of rosin oil, and 5 gallons of naphtha or other suitable thinner. The same ingredients when added to the second base composition above mentioned, together with 5 pounds of water and 120 pounds lithopone, or some other pigment or coloring material, make a batch of approximately 130 gallons, slightly over 40% of the entire batch consisting of drip oil. This composition is particularly useful in waterproofing concrete surfaces, and in protecting metal parts, such as the hulls of iron ships, metal tanks, and the like.

It should be understood, however, that not all of these ingredients are essential, the composition necessarily being changed in accordance with the requirements of particular uses. The enamel oil serves both as a binder and also to give a good gloss. The rosin acts as a hardener. The rosin oil adds to the electrical insulating properties of the composition, but obviously may be omitted under some circumstances.

The consistency of the composition also will depend upon the requirements of individual situations. The composition may be thinned with naphtha or other thinners for spraying purposes or may be greatly thickened by increasing the relative proportions of the solid constituents, particularly the Portland cement. In fact, if these proportions are so changed that the composition assumes the consistency of a thick paste suitable for application with a trowel, it then finds an important use as a waterproofing coating in closing cracks and stopping leaks in concrete walls, tunnel linings, cellars, and the like.

In any of the compositions in which Portland cement is used, some water preferably is added to assist in the "setting" of the cement as the coating material dries. Even if the water were omitted, however, the coating would "set" due to its absorption of water from the surface to which it is applied or from the atmosphere.

The Syps enamel oil above mentioned as an ingredient of the composition has approximately the following composition: 100 gallons ester gum (esterized rosin), 28 gallons Chinawood oil, 7 gallons linseed oil, 8 pounds lead cobalt dryer, and 52 gallons benzine.

It will be observed that in all of the compositions above mentioned the drip oil forms a high percentage of the total volume of the final product. Due to the fact that this oil has been regarded as waste material and since the proportions of the more expensive ingredients are relatively small, the coating composition can be made very economically. At the same time it produces decidedly superior results in many situations, particularly those in which difficulty in stopping leaks and maintaining the desired degree of waterproofness has heretofore been a serious problem, or where the coating must be applied to damp surface. The compositions dry readily both indoors and outdoors.

While I have herein disclosed typical compositions embodying my invention or discovery in preferred forms, it will be understood that these compositions are given rather by way of explanation than limitation, and that the invention may be embodied in a great variety of forms without departing from the spirit or scope thereof. This application is a continuation-in-part of my pending application Serial No. 396,405, filed September 30, 1929.

Having thus described my invention, what I desire to claim as new is:

1. A coating composition containing drip oil associated with a substantial proportion of hydraulic cement and a dryer.

2. A coating composition adapted to harden when exposed to moisture and containing drip oil and a substantial proportion of Portland cement.

3. A coating composition containing a relatively high percentage of drip oil, a smaller percentage of a dryer, and a sufficient proportion of Portland cement to thicken the entire mass.

CHESTER S. HATHAWAY.